ance to the Keever modified Scott viscosity test of 45 seconds for 100 cc. of cooked paste for 7 oz./gel. starch; and 33⅓% of a cross-bonded amylopectin starch having a viscosity according to the same Keever modified Scott viscosity test of 45 seconds for 100 cc. of cooked paste for 4½ oz./gal. This mixture...

United States Patent Office 3,081,183
Patented Mar. 12, 1963

3,081,183
BLENDED CARBOHYDRATE TEXTILE SIZE COMPOSITIONS
Gertrude A. Roscelli, Columbus, and Robert L. High, Canal Winchester, Ohio, assignors to National Industrial Products Company, Columbus, Ohio
No Drawing. Filed Aug. 26, 1960, Ser. No. 52,039
5 Claims. (Cl. 106—197)

The invention disclosed and claimed in this application relates to textile sizes and is illustrated by embodiments consisting of mixtures of blends of starches with sodium carboxymethyl cellulose. Such mixtures are eminently suitable for textile sizes and for textile finishes.

It has been proposed heretofore to prepare textile sizes by mixing carboxymethyl cellulose with starch, as for instance in a brochure published by the E. I. du Pont de Nemours and designated "Brochure A–830 Sodium CMC" (copyright 1950). On pages 5 and 6 there is a disclosure of the use of sodium carboxymethyl cellulose either alone or in combination with converted starches or gums as a warp size for cotton or viscose acetate and viscose wool blends. By starches as suggested in this publication are apparently meant either corn or wheat starch (unmodified or modified).

We have found, however, that combinations of sodium salts of carboxymethyl cellulose (sometimes hereinafter called CMC) with blends of amylopectin starches and wheat starches possess peculiar advantages over mixtures of the carboxymethyl cellulose with any single unmodified or modified starches alone (whether a wheat starch or a corn starch).

One of the objects of our invention therefore is the production of an improved sizing.

A further object of our invention is the improvement of carboxymethyl cellulose sizing mixtures.

A further object of our invention is the production of an improved warp sizing.

Further objects and features of our invention will be apparent from the following specification and claims.

We have found that while mixtures of conventional corn starches and carboxymethyl cellulose salts produce excellent sizes for warp sizing and while mixtures of wheat starch and carboxymethyl cellulose starch also produce excellent sizes, mixtures of carboxymethyl cellulose salt with blends of amylopectin starches and wheat starch produce unexpectedly superior sizes for warp sizing and finishing.

From all of our experiments, it appears that both amylopectin corn starch and wheat starch, as well as CMC are almost all necessary components for the best warp sizing. CMC penetrates the yarns completely but has an unlimited capacity to absorb moisture causing the possibility of soft warps. The red and white milos have good adhesive properties and clarity, but produce non-continuous and brittle films on warps during drying. They then become tacky with moisture regained. Blends of wheat and amylopectin corn starches appear to control continuity and cohesive bonding and have a tendency to form flexible films on the surface of the warps. More important, they appear to arrive at an optimum moisture equilibrium and to be more independent of relative humidity.

Wheat and milo blends were also checked by us with polyacrylic acid, polyvinyl acetate, polyvinyl alcohol, with and without CMC. CMC is definitely a better plasticizer in the sense that it is also a thickening agent. It is a well known fact that percent pickup depends not only upon concentration of materials and time in the size bath, but also upon the viscosity of the solution that the warp is passing through. CMC also behaves as a wetting agent. CMC behaves also as a sequestering agent for starch granules, thus simplifying considerably the de-sizing operation. As the ratio of CMC to starch approaches 1:2 in the size formulation, the size can be removed by boiling water in 15 to 30 minutes time. At lower CMC to starch ratios, traces are still found, but they range from 0.30% for native starch-CMC blends to 0.10% and lower if at least one of the starches used in the formulation is modified. Thus, if it is unnecessary that all traces of the size be removed by washing, a minimum quantity of CMC down to 5% may be used. If no CMC is used, acids or enzymes are usually necessary to remove the starch sizing. If a permanent size is desired, the property of CMC as a sequestering agent can also be utilized. CMC, as reported in the literature, can be made completely insoluble by passing the cloth through a bath containing heavy metal ions such as copper, aluminum, and zirconium. Another very desirable feature in using the CMC in the blends is the lowered BOD (biological oxygen demand) over conventional starch sizes. Again, best results are obtained if the ratio of CMC to starch is at least 1:2 (i.e. 33⅓% CMC and the starches used making up the other 66⅔%).

Amylopectin films (where for example only amylopectin starch and CMC are used) are transparent, possessing good adhesion to the surface but very poor cohesive properties, and little or no water retention as evidenced by brittleness and cracking of the film on the surface of the swatches during drying. Thus, although the CMC and amylopectin films possess good adhesive and cohesive properties, the films are still rather brittle. With the addition of wheat starch in the formulation, the films produced lose a little in clarity on the colored cloth but are continuous and very flexible.

Two types of film tests were employed in evaluating the properties of the different blends. Each blend of starches and CMC was cooked and then flowed over a highly polished metal surface, and guide rods rolled over the surface to ensure a uniform film of specific thickness. Continuity, surface characteristics, water solubility, uniformity, and clarity were checked for each of the blends prepared. Swatches of nylon, Dacron, acetate, Dacron-cotton, and cotton, white, navy blue and brightly printed fabrics were chosen in order to evaluate the blends completely.

Following are examples of the preparation and uses of our improved sizing products.

*Example I*

We mixed together 33⅓% sodium carboxymethyl cellulose having a viscosity of 100 centipoises (4½ oz./gel. Scott viscosity); 33⅓% wheat starch having a viscosity, according to the Keever modified Scott viscosity test, or 45 seconds for 100 cc. of a cooked paste for 7 oz./gel. starch; and 33⅓% of a cross-bonded amylopectin starch having a viscosity according to the same Keever modified Scott viscosity test of 45 seconds for 100 cc. of cooked paste for 4½ oz./gal. This mixture was used in a warp sizing test and was found to have superior warp sizing characteristics over either warp sizes consisting of the starches alone, warp sizes consisting of CMC alone, or warp sizes consisting of any single type starch mixed with carboxymethyl cellulose. It had good adhesion, was translucent, formed a continuous flexible film, and had good moisture retention. On washing the sized material with hot water for 30 minutes, all of the size was removed.

*Example II*

We mixed together 33⅓% carboxymethyl cellulose having a viscosity of 100 centipoises (4½ oz./gal. Scott viscosity); 33⅓% of a special blend (Keever P40) of corn starch and wheat starch having a viscosity according to the Keever modified Scott viscosity test of 45 seconds for 100 cc. of a cooked paste for a 40 oz./gal. starch; and 33⅓% amylopectin starch having a viscosity according to the same Keever modified Scott viscosity test of 45 seconds for 100 cc. of a cooked paste for a 23 oz./gal. starch. Similar results were obtained as those obtained in Example I.

*Example III*

We mixed together 33⅓% CMC having a viscosity of 50 centipoises (5½ oz./gal. Scott viscosity); 33⅓% wheat starch having a viscosity according to the Keever modified Scott viscosity test of 45 seconds for 100 cc. of cooked paste for a 25 oz./gal. starch; and 33⅓% amylopectin starch having a viscosity according to the same Keever modified Scott viscosity test of 45 seconds for 100 cc. of a cooked paste for a 15 oz./gal. starch. Similar results were obtained, as those obtained in Examples I and II.

*Example IV*

We mixed together 5% CMC having a viscosity of 50 centipoises (5½ oz./gal. Scott viscosity); 47½% wheat starch having a viscosity according to the Keever modified Scott viscosity test of 45 seconds for 100 cc. of a cooked paste for a 25 oz./gal. starch; and 47½% of amylopectin starch having a viscosity according to the same Keever modified Scott viscosity test of 45 seconds for 100 cc. of a cooked paste for a 15 oz./gal. starch. Similar results were obtained as those obtained in Examples I–III except as to ease of desizing. However, after sizing textiles with this material and then washing with hot water, a trace (not objectionable in most cases) of the size remained in the textile.

*Example V*

We mixed together 35% sodium carboxymethyl cellulose having a viscosity of 100 centipoises; 60% thick wheat starch having a viscosity, according to the Keever modified Scott viscosity test, of 45 seconds for 100 cc. of a cooked paste for 7 oz./gal. starch; and 5% of an amylo starch having a viscosity according to the same Keever modified Scott viscosity test of 45 seconds for 100 cc. of a cooked paste for 15 oz./gal. This mixture was used in a warp sizing test and it was found to have the greatly superior warp sizing characteristics observed in Example I, etc. excepting with regard to penetration and adhesion. It showed a good continuous flexible film. The moisture retension was good. It showed good adhesion for Dacron materials but the adhesion qualities on nylon were poor.

*Example VI*

We mixed together 35% carboxymethyl cellulose having a viscosity of 100 centipoises; 60% thin boiling wheat starch having a viscosity according to the Keever modified Scott viscosity test of 45 seconds for 100 cc. of a cooked paste for a 16 oz./gal. starch; and 5% of an amylo starch having a viscosity according to the same Keever modified Scott viscosity test of 45 seconds for 100 cc. of a cooked paste for a 15 oz./gal. starch. This mixture was used in a warp sizing test and we found that it had the greatly superior warp sizing characteristics observed in Example I, etc., except with regard to penetration and adhesion. It provided a good continuous flexible film. The moisture retention was good. It showed good adhesion on Dacron and fair adhesion on nylon.

*Example VII*

We mixed together 35% CMC having a viscosity of 50 centipoises; 5% wheat starch having a viscosity, according to the Keever modified Scott viscosity test, of 45 seconds for 100 cc. of a cooked paste for a 7 oz./gal. starch; and 60% amylo starch having a viscosity according to the same Keever modified Scott viscosity test of 45 seconds for 100 cc. of a cooked paste for a 15 oz./gal. starch. This mixture was used in a warp sizing test and we found that it had the greatly superior warp sizing characteristics observed in Examples I, etc. It provided a good continuous fairly flexible film. The moisture retention was good. It showed good adhesion for all materials including Dacron and nylon.

*Example VIII*

We mixed together 5% CMC having a viscosity of 50 centipoises, 47½% wheat starch having a viscosity according to the Keever modified Scott viscosity test of 45 seconds for 100 cc. of a cooked paste for a 7 oz./gal. starch; and 47½% of amylo starch having a viscosity according to the same Keever modified Scott viscosity test of 45 seconds for 100 cc. of a cooked paste for a 4½ oz./gal. starch. By using this mixture for warp sizing, substantially identical results were obtained as those observed in Example IV. A translucent film was formed which had good continuous flexible characteristics and which had good moisture retaining characteristics. On washing with hot water for 30 minutes only a trace of size remained.

*Example IX*

We mixed together 35% CMC having a viscosity according to the Keever modified Scott viscosity test of 45 seconds for 100 cc. of a cooked paste for a 15½ oz./gal. starch and 65% of an amylo starch having a viscosity according to the Keever modified Scott viscosity test of 45 seconds for 100 cc. of cooked paste for a 9 oz./gal. starch. The film of this starch was brittle and not as satisfactory as the products of the preceding examples.

*Example X*

We mixed together 35% CMC having a viscosity of about 35 centipoises (6½ oz./gal. Scott viscosity) and 65% of a wheat starch having a viscosity according to the Keever modified Scott viscosity test of 45 seconds for 100 cc. of a cooked paste for a 16 oz./gal. starch. The size of this mixture was not as satisfactory because of poorer adhesion than the products of Examples I–VIII.

*Example XI*

We mixed together 50% of an amylo starch having a viscosity according to the Keever modified Scott viscosity test of 45 seconds for 100 cc. of a cooked paste for a 4½ oz./gal. starch and 50% of a wheat starch having a viscosity according to the Keever modified Scott viscosity test of 45 seconds for 100 cc. of a cooked paste for a 7 oz./gal. starch. This mixture was not as satisfactory as a size because the film was brittle and the size could not be washed out with warm water but required either acid or enzyme treatment for removal.

*Example XII*

We mixed together 35% CMC having a viscosity of 23 centipoises (5½ oz./gal. Scott viscosity) and 65% of a 60 fluidity acid modified corn starch having a viscosity according to the Keever modified Scott viscosity test of 45 seconds for 100 cc. of a cooked paste for a 10 oz./gal. starch. The film was not continuous and was brittle. It was not as satisfactory as the products of Examples I–VIII.

*Example XIII*

We mixed together 35% CMC having a viscosity of 23 centipoises (5½ oz./gal. Scott viscosity) and 65% of a pearl corn starch having a viscosity according to the Keever modified Scott viscosity test of 45 seconds for 100 cc. of a cooked paste for a 5½ oz./gal. starch. Similar results were obtained to those of Example XII.

We performed many more experiments using mixtures of CMC and amylopectin starch, and mixtures of CMC, amylopectin starch and wheat starch, in varying proportions of the two or three components from 5% CMC to 50% CMC; from 0% amylopectin starch to 95% amylopectin starch and from 0% wheat starch to 95% wheat starch. We used CMC having a viscosity of from 5 centipoises to 100 centipoises; we used amylopectin starch having fluidities of from 4½ oz./gal. to 34 oz./gal.; and we used wheat starch having fluidities of from 6½ oz./gal. to 40 oz./gal.

We tested ethylene oxide treated starch and many other treated starches in various combinations with CMC, and with CMC and other starch. We found that combinations of CMC, amylopectin starch and wheat starch, or combinations of CMC, amylopectin starch and blends of wheat and corn starch, gave the best results.

The following table shows some of the combinations giving good results comparable to the products of Examples I–VIII. These combinations provide for any desired condition of adhesion, penetration, viscosity, cohesion, clarity, etc. In the table are shown thirty examples. In each of these examples we used a mixture of three components. The first component was always 33⅓%–6½ oz. CMC. The second component was one of the five components listed at the top of the five columns as "Second Component." The third component was one of the amylopectin starches listed in the various columns under its particular second component.

With the tests which we have made, we have found that our blended product consisting of carboxymethyl cellulose salts and an amylopectin type starch, including amylo maize (white milo) and waxy maize starch together with a wheat starch gives a very superior sizing product. It is superior to previously used textile sizes including straight starch textile sizes, carboxymethyl cellulose blends with conventional type starch, carboxymethyl cellulose salts alone or any other textile sizes of which we are aware.

The components may be used in any degree of proportions provided there is at least 5% and preferably 33⅓% of the amylopectin type starch and that there is present at least approximately 5% of the carboxymethyl cellulose salt and also at least 5% of wheat starch or wheat-corn starch blend. The balance of the mixture may be wheat starch which increases the volume of the mixture without increasing costs proportionately and gives as good results.

The viscosity of the components may vary widely. Thus the viscosity of the carboxymethyl cellulose may vary from 5 cps. to 100 cps. The viscosity of the amylopectin type starch may vary from a 4½ oz. starch fluidity to a 34 oz. starch fluidity according to the Keever modified Scott viscosity test explained below; and the viscosity

| First Component | 33⅓% 6½ oz. carboxymethyl cellulose | | | | |
|---|---|---|---|---|---|
| Second Component | 33⅓% 40 oz./gal. wheat starch and corn starch blend. | 33⅓% 40 oz./gal. oxidized wheat starch. | 33⅓% 16 oz. wheat starch. | 33⅓% 8 oz./gal. wheat starch and corn starch blend. | 33⅓% 7 oz./gal. wheat starch. |
| Third Component selected as Shown in All of the Boxes in This Group. | 33⅓% 4½ oz. cross bonded amylopectin starch. | 33⅓% 4½ oz. cross bonded amylopectin starch. | 33⅓% 4½ oz. cross bonded amylopectin starch. | 33⅓% 4½ oz. cross bonded amylopectin starch. | 33⅓% 4½ oz. cross bonded amylopectin starch. |
| | 33⅓% 4½ oz. unmodified milo amylopectin starch. | 33⅓% 4½ oz. unmodified milo amylopectin starch. | 33⅓% 4½ oz. unmodified milo amylopectin starch. | 33⅓% 4½ oz. unmodified milo amylopectin starch. | 33⅓% 4½ oz. unmodified milo amylopectin starch. |
| | 33⅓% 9 oz. acid modified amylopectin starch. | 33⅓% 9 oz. acid modified amylopectin starch. | 33⅓% 9 oz. acid modified amylopectin starch. | 33⅓% 9 oz. acid modified amylopectin starch. | 33⅓% 9 oz. acid modified amylopectin starch. |
| | 33⅓% 15 oz. acid modified amylopectin starch. | 33⅓% 15 oz. acid modified amylopectin starch. | 33⅓% 15 oz. acid modified amylopectin starch. | 33⅓% 15 oz. acid modified amylopectin starch. | 33⅓% 15 oz. acid modified amylopectin starch. |
| | 33⅓% 23 oz. acid modified amylopectin starch. | 33⅓% 23 oz. acid modified amylopectin starch. | 33⅓% 23 oz. acid modified amylopectin starch. | 33⅓% 23 oz. acid modified amylopectin starch. | 33⅓% 23 oz. acid modified amylopectin starch. |
| | 33⅓% 31 oz. acid modified amylopectin starch. | 33⅓% 31 oz. acid modified amylopectin starch. | 33⅓% 31 oz. acid modified amylopectin starch. | 33⅓% 31 oz. acid modified amylopectin starch. | 33⅓% 31 oz. acid modified amylopectin starch. |
| | 33⅓% 34 oz. acid modified amylopectin starch. | 33⅓% 34 oz. acid modified amylopectin starch. | 33⅓% 34 oz. acid modified amylopectin starch. | 33⅓% 34 oz. acid modified amylopectin starch. | 33⅓% 34 oz. acid modified amylopectin starch. |

The following table lists some of the additional combinations also used which gave good results comparable to the results of Examples I–VIII except that these should be used preferably only where the BOD requirements are not as stringent and where complete desizing in hot water is not required:

| First component | 5% CMC (6½ oz.) | 15% CMC (6½ oz.) |
|---|---|---|
| Second and Third Components Selected as shown From the Boxes Indicated. | 47.5% 16 oz. wheat; 47.5% 4½ oz. cross bonded amylopectin. | |
| | 47.5% 7 oz. wheat; 47.5% 15 oz. amylopectin. | 42.5% 7 oz. wheat; 42.5% 15 oz. amylopectin. |
| | 47.5% 7 oz. wheat; 47.5% 23 oz. amylopectin. | |
| | 47.5% 16 oz. wheat; 47.5% 9 oz. amylopectin. | 42.5% 16 oz. wheat; 42.5% 4½ oz. cross bonded amylopectin. |
| | 47.5% 16 oz. wheat; 47.5% 15 oz. amylopectin. | | of the wheat starch may vary from a fluidity of 6½ oz. to 40 oz. according to the Keever modified Scott viscosity test explained below.

The Keever Scott viscosity test is a test for measuring the viscosity of starch. The starch to be tested is concentrated or diluted to create a concentration which will produce a cooked paste that will pass through a Scott viscosity meter at the rate of 100 cc. in about 45 seconds. The number of ounces of starch to the gallon of water at the time of the test gives the fluidity of the starch. Thus a 6 oz. starch has a high viscosity, a 7 oz. starch a lower viscosity, and a 10 oz. starch a very low viscosity, and a 20 oz. or 40 oz. an extremely low viscosity.

In one mill using our product, weaving efficiency was increased 1½% and shedding was reduced substantially. Our combination of ingredients enhances the adhesive properties over the combination of CMC and wheat alone. It eliminates brittleness, improves flexibility, and provides moisture equilibrium at a lower percent over the combination of CMC and milo. Also, the film of our combination of ingredients is continuous while that of CMC and milo is not continuous. Inclusion of milo starch gives better penetration and adhesion. A ratio of 1 part CMC to 2 parts starch provides a product which washes easily. Smaller proportions of milo give a size with which there is more difficulty in desizing with hot water. Our product is more economical because the textiles may be sized with less solids added on (a normal 13% goes down to 5%).

Amylopectin type starch is a term well known in the art to designate a starch which is substantially 100% amylopectin (i.e. α starch) as distinguished from ordinary type starch which consists of about 80% amylopectin and about 20% amylose (i.e. β starch). Examples of amylopectin type starch are waxy maize starch and milo maize or white milo starch. Waxy maize is a maize or corn which has been artificially developed by breeding to increase the percent of amylopectin of the natural maize or corn until it is substantially 100% amylopectin. White milo on the other hand, is a distinct variety of grain different from corn, wheat, and other ordinary grains, which in nature is substantially 100% amylopectin.

It is to be understood that the above described embodiments of our invention are for the purpose of illustration only and various changes may be made therein without departing from the spirit and scope of our invention.

We claim:
1. For a textile size for use as a warp size in weaving, a composition of matter consisting essentially of
   from 5 to 90% of an amylopectin type starch;
   from 5 to 90% of a starch selected from the group consisting of wheat starch and a blend of corn starch and wheat starch; and
   from 5 to 50% of sodium carboxy-methyl cellulose.

2. For a textile size for use as a warp size in weaving, a composition of matter consisting essentially of:
   about 33⅓% of an amylopectin type starch;
   about 33⅓% of wheat starch; and
   about 33⅓% of carboxymethyl cellulose.

3. For a textile size for use as a warp size in weaving, a composition of matter consisting of:
   from 5–90% of an amylopectin type starch;
   from 5 to 50% of sodium carboxymethyl cellulose; and
   the remainder which must be at least 5% of the total composition of a wheat starch.

4. For a textile size, a composition of matter consisting of from 5–90% of a milo maize starch, from 5–90% of a wheat starch, and from 5–50% sodium carboxymethyl cellulose.

5. For a textile size a composition of matter consisting a from 5–90% of waxy maize starch, from 5–90% of a wheat starch, and from 5–50% sodium carboxymethyl cellulose.

References Cited in the file of this patent

UNITED STATES PATENTS

| | | |
|---|---|---|
| 2,180,152 | Kohler | Nov. 14, 1939 |
| 2,276,704 | Schneevoigt et al. | Mar. 17, 1942 |
| 2,764,568 | Hawkins | Sept. 25, 1956 |
| 2,779,693 | Pascu et al. | Jan. 29, 1957 |
| 2,811,462 | Cramer et al. | Oct. 29, 1957 |

UNITED STATES PATENT OFFICE
CERTIFICATE OF CORRECTION

Patent No. 3,081,183                      March 12, 1963

Gertrude A. Roscelli et al.

It is hereby certified that error appears in the above numbered patent requiring correction and that the said Letters Patent should read as corrected below.

Column 2, lines 50 and 51, for "4½ oz./gel." read -- 4½ oz./gal. --; column 2, line 53, for "or" read -- of --; lines 53 and 54, for "7 oz./gel." read -- 7 oz./gal. --; columns 5 and 6, first table, third column thereof, fourth box down, for "33 1/3% 9 ox. acid" read -- 33 1/3% 9 oz. acid --.

Signed and sealed this 29th day of October 1963.

(SEAL)
Attest:

ERNEST W. SWIDER

Attesting Officer

EDWIN L. REYNOLDS

Acting Commissioner of Patents